(12) United States Patent
Horst et al.

(10) Patent No.: US 10,345,821 B2
(45) Date of Patent: Jul. 9, 2019

(54) FLOOR-TREATMENT APPARATUS AND NAVIGATION SYSTEM THEREFOR

(71) Applicant: UNIVERSITAET BIELEFELD, Bielefeld (DE)

(72) Inventors: Michael Horst, Bielefeld (DE); Ralf Moeller, Bielefeld (DE); Florian Patzelt, Buende (DE)

(73) Assignee: UNIVERSITAET BIELEFELD, Bielefeld (DE)

( * ) Notice: Subject to any disclaimer, the term of this patent is extended or adjusted under 35 U.S.C. 154(b) by 26 days.

(21) Appl. No.: 15/554,822

(22) PCT Filed: Apr. 26, 2016

(86) PCT No.: PCT/EP2016/000662
§ 371 (c)(1),
(2) Date: Aug. 31, 2017

(87) PCT Pub. No.: WO2016/180514
PCT Pub. Date: Nov. 17, 2016

(65) Prior Publication Data
US 2018/0052471 A1     Feb. 22, 2018

(30) Foreign Application Priority Data

May 13, 2015    (DE) .................. 10 2015 006 014

(51) Int. Cl.
*G05D 1/00*     (2006.01)
*G05D 1/02*     (2006.01)
(Continued)

(52) U.S. Cl.
CPC .............. *G05D 1/0248* (2013.01); *A47L 9/28* (2013.01); *G01C 21/206* (2013.01); *G05D 1/024* (2013.01);
(Continued)

(58) Field of Classification Search
None
See application file for complete search history.

(56) References Cited

U.S. PATENT DOCUMENTS 7,756,615 B2    7/2010  Barfoot
8,068,935 B2 *  11/2011 Kanayama ........... G05D 1/0221
                                           382/103
(Continued)

FOREIGN PATENT DOCUMENTS

DE    102007016802 A    5/2008
DE    102012112036 A    6/2014

*Primary Examiner* — Truc M Do
(74) *Attorney, Agent, or Firm* — Andrew Wilford

(57) ABSTRACT

A self-driving floor-treatment device navigates by recording images at respective locations along a travel path by a camera the device travels to form a topological map in a database to which a node is added by the floor-treatment device for every location at which an image is recorded and to which an environment images is associated. Each newly recorded environment image with at least one neighboring location in limited proximity of the location belonging to the newly recorded environment image for which a node and an associated environment image have been stored in the map by the same or another floor-treatment device. A new connection is added from the newly recorded node to the associated node of each and every identified neighboring location on the topological map.

11 Claims, 1 Drawing Sheet

(51) Int. Cl.
- *G06F 16/29* (2019.01)
- *G06F 16/58* (2019.01)
- *A47L 9/28* (2006.01)
- *G01C 21/20* (2006.01)
- *G06K 9/00* (2006.01)
- *G06K 9/20* (2006.01)
- *G06K 9/62* (2006.01)
- *G06K 9/78* (2006.01)
- *G06T 3/60* (2006.01)
- *H04N 7/18* (2006.01)

(52) U.S. Cl.
CPC ......... *G05D 1/0219* (2013.01); *G05D 1/0272* (2013.01); *G05D 1/0274* (2013.01); *G05D 1/0297* (2013.01); *G06F 16/29* (2019.01); *G06F 16/5866* (2019.01); *G06K 9/00805* (2013.01); *G06K 9/209* (2013.01); *G06K 9/6202* (2013.01); *G06K 9/78* (2013.01); *G05D 1/0246* (2013.01); *G05D 2201/0215* (2013.01); *G06K 2209/21* (2013.01); *G06T 3/60* (2013.01); *H04N 7/183* (2013.01)

(56) References Cited

U.S. PATENT DOCUMENTS

| | | | | |
|---|---|---|---|---|
| 8,384,776 | B2 * | 2/2013 | Dolgov | G01C 21/20 348/116 |
| 8,705,842 | B2 * | 4/2014 | Lee | G05D 1/0274 382/153 |
| 9,069,354 | B2 * | 6/2015 | Ryu | G05D 1/02 |
| 9,188,982 | B2 * | 11/2015 | Thomson | G05D 1/0274 |
| 9,722,640 | B2 * | 8/2017 | Williams | H04B 1/0092 |
| 2008/0294338 | A1 * | 11/2008 | Doh | G05D 1/0234 701/533 |
| 2015/0148951 | A1 * | 5/2015 | Jeon | G05D 1/0219 700/248 |
| 2017/0131721 | A1 * | 5/2017 | Kwak | B25J 9/1664 |

\* cited by examiner

FLOOR-TREATMENT APPARATUS AND NAVIGATION SYSTEM THEREFOR

CROSS REFERENCE TO RELATED APPLICATIONS

This application is the US-national stage of PCT application PCT/EP2016/000662 filed 26 Apr. 2016 and claiming the priority of German patent application 102015006014.7 itself filed 13 May 2015.

FIELD OF THE INVENTION

The invention relates to a navigation method for at least one self-driving floor- or ground-treatment device, preferably for a plurality of floor-treatment devices that simultaneously, i.e. in a temporally parallel manner, treat a floor.

BACKGROUND OF THE INVENTION

In such a system the drives of a respective floor-treatment device are controlled as a function of obstacle information about obstacles detected by the respective floor-treatment device, with obstacles being constituted by at least real objects, such as for example walls whose obstacle information is detected by sensors on the respective floor-treatment device while a respective floor-treatment device recording environment images in temporal and/or spatial intervals at points along the travel path by a camera that is carried along.

A plurality of floor-treatment devices that work in a temporally parallel manner can thus form a group of floor-treatment devices.

Moreover, the invention also relates to a floor- or ground-treatment device for carrying out the method.

Self-driving floor- or ground-treatment devices are known in the prior art in a multitude of designs. Typical representatives of such floor-treatment devices are robotic vacuum cleaners, robotic floor scrubbers, or robotic lawnmowers. The invention can relate to any type of such devices and preferably to robotic vacuum cleaners.

The floor-treatment devices each have controlled, particularly feedback-assisted drives, so that these floor-treatment devices are able to move automatically over the floor surface. These drives typically comprise two independently controllable wheels and a freely rotatable swivel caster or ball, with cornering being performed by controlling the wheels at different rotational speeds, particularly so that so-called differential steering is achieved. Control is effected by electronics integrated into the device and take over the navigation of the device on a floor surface, for example as a function of sensor signals or calculated values.

Typical floor-treatment devices can have a device body with a circular footprint, for example, with a floor-treatment device being integrated into the device body on the bottom side, particularly between the wheels, such as in a vacuum-cleaning device or a rotating blade, for example.

The driven wheels can have wheel sensors in order to provide travel-distance data for the navigation of such a device, such as specifically traveled routes.

The devices, which preferably move on only one plane, have sensors that are suitable for detecting obstacles in the context of navigation, for example collision sensors that respond to touch, or preferably noncontact sensors formed for example as laser scanners.

It is known in this context to use a laser that rotates on a horizontal plane in order to detect distances to obstacles in an angle-dependent manner, or also a fixed number of laser beams, all of which emanate from the device on a preferably common horizontal plane in order to sense, with each one of these beams, several distance values to a respective obstacle or even to several obstacles at then-established angles relative to the direction of motion of the device.

On the basis of obstacle information that is detected in this way and thus preferably consists of several value pairs of angles and distance, a floor-treatment device can preferably navigate in a collision-free manner, particularly to carry out a first type of navigation.

It is known in the prior art to implement a navigation algorithm in the controlling electronics of such a device with which so-called wall tracking can be performed on a real wall of a room, for example, or another real obstacle can be tracked, which preferably means that the device travels parallel to an extension of the obstacle, such as a wall at a controlled spacing. It is also known for such a device to move freely in the space on a straight path, for example, until it comes across an obstacle and turns around.

In the prior art, the type of trajectory traveled is specified beforehand in the electronics, usually as a meandering path or spiral path. In case of a predefined meandering path, this means that a floor-treatment device reverses its direction of motion when an obstacle has been detected in front of it and travels back at a spacing from its own previously traveled path. It is irrelevant whether the previously traveled path ran along a wall or was in open space.

In such a navigation algorithm for driving along one or more obstacles, which is inherently sufficiently known in the prior art and to a person skilled in the art, value pairs of angle (at which the device "sees" the obstacle) and distance (at this angle), for example from the midpoint of the device to the obstacle, are delivered to the algorithm, upon which the algorithm calculates a distance value to the obstacle transverse, preferably perpendicular to the direction of motion, provided that it is not also provided by the sensor(s), and maintains the spacing from a target value by controlling the drives of the wheels.

It is also known in the prior art to perform navigation by so-called local visual homing. Local visual homing is a term for a group of methods in which a vector, the so-called home vector, is calculated from two images that were recorded at different locations and indicates the direction from the location at which one of the images was recorded to the location at which the other image was recorded. The spacing between the two locations is not calculated.

If several, for example a plurality of images is available, triangulation can be employed on at least two home vectors using known spacings between the locations in order to determine the spacing from the device to a path along which the floor-treatment device has already traveled and along which it has recorded several images itself.

The possibility thus exists to even navigate on the basis of environment images that were recorded at locations at which a treatment device has already been. Different ways of carrying out local visual homing are known in the prior art and also sufficiently familiar to a person skilled in the art.

For example, DE 10 2007 016 802 describes how a floor-treatment device performs distance control to its own previous path on the basis of environment images that were recorded on its own predefined meandering or spiral travel path and the method of local visual homing through triangulation based on calculated home vectors.

Since the homing method is performed using environment images that were recorded by the device itself and the device travels along a predefined, in this case meandering path, the device knows which of the environment images it must use in each case for triangulation and distance control on its new path segment; after all, in the case of a reversal of direction, the device travels in the reverse sequence past the locations at which it recorded environment images on the previous path. The selection of the images to be used is performed here on the basis of absolute metric information by means of which the required images are accessed.

In the prior art, the (for example meandering) path is specified by determining a point on the path to be traveled to which the floor-treatment device is to travel from its current location, and the floor-treatment device is controlled appropriately in order to reach that point. In order to establish the point, the type of path to be traveled must have been stored in the electronics of the device. Each point to be traveled to must satisfy the criterion of lying on the predefined path. A path is thus composed of a plurality of specified points that are traveled to one after the other.

It is thus possible, for example, to perform (for example meandering) navigation on parallel predefined paths, starting from a path parallel to a wall obstacle, for example, even if the original wall obstacle can no longer be "seen" by the distance sensors because it is too far away, or even starting from a path that passes freely through space.

For this reason, sensor-based navigation on the basis of obstacle information (angle, distance) and local visual homing is often combined in floor-treatment devices. In the prior art, however, navigation around obstacles momentarily suspends the otherwise prevailing path specification.

Both in the invention that will be described herein and in the prior art, environment images are preferably employed for the purpose of navigating through local visual homing represent a 360° panorama of the surroundings of the location at which the environment image is recorded. To this end, the vertical optical axis of a camera can be pointed at the midpoint of a hyperbolic mirror, for example, so that a horizontal 360° panoramic image is recorded.

In the prior art, particularly in the art cited above, it is regarded as disadvantageous that homing-based navigation can only be carried out if the floor-treatment devices have acceptable computing capacity, if the path to be navigated, as described above, is known beforehand, and if it follows from that knowledge which environment images of previous path points are to be used for the local visual homing that is to be carried out. It is therefore not possible for any desired path shape to be covered in the prior art.

The known procedure of this prior art also assumes that the floor-treatment device travels past its own previously traveled path, since otherwise no environment images can be identified on the basis of which homing can be performed.

If several floor-treatment devices are optionally used on the same floor surface, multiple treatments of the same areas of the surface by different floor-treatment devices would therefore occur, which entails redundant effort.

OBJECT OF THE INVENTION

Against this background, it is an object of the invention to provide a navigation method with which any desired paths of motion of a floor-treatment device are possible, with such a method being preferably provided that does not rely on environment images of the same floor-treatment device that are predetermined by the path in order to carry out local visual homing, but rather any images in the proximity of the floor-treatment device can be used, independently of the origin of these environment images.

In particular, it is an object of the invention to provide a method in which a ground or floor surface can also be treated by several floor-treatment devices in a temporally parallel manner without the occurrence of multiple treatments of one or more areas of the surface.

SUMMARY OF THE INVENTION

According to the invention, this object is achieved in that, according to a first aspect of the invention, a topological map is formed in a database into which a node is added by the respective floor-treatment device for every location at which an environment image, preferably a 360° panoramic image is recorded, with which node at least the environment image is associated, and in that connections are formed between a newly added node and at least one node that already exists on the map and was already added by the same floor-treatment device with which relative metric information is associated.

According to this aspect, a preferably purely topological map is constructed according to the invention on the basis of which the navigation can be performed in addition to the navigation by obstacle sensors, particularly on the basis of local visual homing here as well.

In terms of the invention, a purely topological map is understood as a graph in the mathematical sense in which the nodes characterize locations in space based on sensor data recorded there, here at least the panoramic camera image, with connects, also referred to as edges, between the nodes indicating mutual reachability. In such connections, relative metric information about the relative position of the locations, from travel-distance data, for example, is stored here.

Accordingly, every node of the map that is constructed or is to be constructed according to the invention represents, through the associated environment image, a location at which a floor-treatment device once was located without giving the location absolute coordinates. Connections between the nodes mean a reachability between the locations that are represented by the nodes. Such connections thus exist at least between the nodes that are added to the map for such locations and along which a respective floor-treatment device has traveled.

The relative metric information associated with the connections can preferably be constituted by the travel-distance data that is collected by the wheel sensors of the respective floor-treatment device, for example, which brings about or itself performs the addition of a node to the map.

The consideration of merely relative metric information, particularly relative positional information, and the absence of absolute positional information is a crucial advantage of the topological map, especially if several floor-treatment devices jointly construct such a topological map, since the floor-treatment devices do not have to agree on a common coordinate system. There is therefore no absolute external or "global" coordinate system for the execution of the method according to the invention, particularly no common coordinate system for several floor-treatment devices.

It is also completely irrelevant for the inventive construction of the topological map whether the method is carried out with only one single floor-treatment device or by several at the same time. Every floor-treatment device participating in the method, i.e. optionally only one, adds nodes to the map for every location at which it has recorded environment images.

According to another essential aspect of the invention, after a floor-treatment device has added a node to the map and the environment image has been assigned, it is determined through a comparison of the new environment image at the current location with all of the environment images in the database that have already been associated with nodes whether there is at least one neighboring location in the limited (spatial) proximity of the current location belonging to the new environment image for which a node and an associated environment image have been stored in the map by the same or another floor-treatment device.

The above-mentioned identification of neighboring locations is limited to those locations that are located in a defined spatial proximity, although the environment need not be established by metric spatial data. Instead, a provision can be made that, during the comparison of images, a visual (i.e. non-spatial) spacing between the current environment image and all of those which have already been stored is identified, and a location is only regarded as being a neighboring location if the visual spacing falls below a threshold. The underlying rationale for this is that, as the spatial distance of the locations decreases, the visual spacing of the associated environment images also decreases, so environment images that fall below the predefined spacing to the current environment image belong to locations that fall below a certain spatial distance, even if it is not established numerically.

The essential advantage of this aspect of the method is that, independently of any path shape, it can be determined through the comparison whether a floor-treatment device is in the proximity of one location or several locations that has or have already been treated, namely also independently of whether this treatment was added to the database or the topological map by the floor-treatment device itself (which provided the current environment image) or by another floor-treatment device that is working in a temporally parallel manner. Since the comparison is performed for every environment image that is newly associated with a node and for all existing images, several neighboring locations can also be found which satisfy the comparison criterion, that is, that constitute a neighboring location in the limited proximity.

According to the invention, if at least one such neighboring location is found to be present through a comparison, a new connection is added starting from the newly added node to the associated node of each and every identified neighboring location on the topological map, whereby reachability information between the locations is added to the topological map.

Another essential aspect of the invention is that, for at least one, preferably all neighboring locations to whose nodes new connections have been added to the map, obstacle information pertaining to the current location of the new environment image is calculated from the data stored in the map, added to the connections in the form of relative metric relationships, and used to control with or without feedback the drives of the respective floor-treatment device. Here, too, this obstacle information can also contain values for angle and distance, calculated by local visual homing, between the current location and each of the neighboring locations found previously through comparison.

For the invention, this means that, in a preferred embodiment, every neighboring location that is found during navigation through comparison, such as an obstacle, can namely be designated as an obstacle that is characterized by an angle value and a distance value relative to the current location as if the obstacle had been detected by sensors as occurs with real obstacles by obstacle sensors such as lasers, for example that was described above.

According to the invention, value pairs of angle and distance are given to a navigation algorithm such as those which are known for the wall tracking described above, and this algorithm controls the drives and/or wheels of the respective floor-treatment device as a function of these values, particularly at a defined spacing from the virtual obstacle. According to the invention, the value pairs of angle and distance are given as a control variable to exactly the same navigation algorithm that also performs the navigation for real obstacles. The navigation or the algorithm in place for that purpose therefore does not differentiate between the obstacle values of real or virtual obstacles.

According to this type of navigation that is inherently known in the prior art, the virtual obstacles identified according to the invention are thus treated as if they were real obstacles, with the effect that areas of the floor that have already been treated by any floor-treatment device are driven around as virtual obstacles by every floor-treatment device.

The control of the spacing from the virtual obstacle, i.e. to a respective neighboring location that has been found, can be performed in exactly the same manner as with the control of the spacing from the real obstacle, such as a wall.

As a result of the navigation of a floor-treatment device on the basis of real and virtual obstacles, the path that is currently to be traveled is not planned and achieved on the basis of points to be driven to according to a path specification; instead, the path results in a situation-dependent manner from the obstacles that are present and along which driving is performed at an established spacing. The invention preferably makes a provision that the floor treatment starts along real obstacles.

In one embodiment, in the event of control relative to a virtual obstacle, another preferably greater distance value is specified as a target value for control than in the case of real obstacles, particularly in order to take into account that, given that the floor has already been treated at the virtual obstacle (neighboring location), a floor-treatment device can pass by at a greater spacing than would be the case with a real obstacle, to which it must drive as closely as possible.

Alternatively, it is possible to scale identified distance values of a respective value pair of angle and distance between the current location and a neighboring location identified through comparison by a factor, particularly so that the distance appears to be smaller to a floor-treatment device than it actually is. In this case, the same distance value between device and obstacle (when viewed perpendicular to the path of the device) can always be used for control during navigation without having to distinguish between real and virtual obstacles.

Thus according to the invention a floor-treatment device continues to move at a spacing from such locations whose nodes/environment images have connections to metric, preferably travel-distance information in the topological map starting from a node of an established neighboring location.

This can be achieved because proximal relationships in terms of the above-mentioned comparison exist for each of these connected locations. A floor-treatment device can thus travel along a path that has already been treated, for example parallel at a controlled spacing, and, by virtue of the advantageous effects of the invention, this can be achieved both in the case of paths that the same floor-treatment device has already traveled and paths that have been traveled by other floor-treatment devices.

If several simultaneously working floor-treatment devices are participating, in order to generate a single, common topological map, the environment images of all of the floor-treatment devices are stored in a common database in a central data-processing system and/or in an individual database for each floor-treatment device on the respective floor-treatment device, in which case the contents of all of the individual databases are particularly identical, or each individual database comprises only a portion of the common map.

In accordance with the invention the lower edge of the environment image, preferably the lower edge of the panoramic image, has a height which is such that the plurality of floor-treatment devices do not detect each other in the environment images.

In contrast, in order to prevent the floor-treatment devices from colliding with one another, a mutual sensorial, or, optionally, mutual visual identification of the floor-treatment devices can be provided, particularly also using the camera with which environment images are recorded.

In every one of these embodiments, there is only one purely topological map to which all of the participating floor-treatment devices add nodes and with which environment images are associated, and all of the floor-treatment devices obtain the data required for navigation from this single topological map.

Even though the floor-treatment devices need not communicate with each other if a central database is formed, they all access the same data, so each floor-treatment device can thus gain knowledge (through the identification of neighboring locations) of areas in which it or another device has already been.

One development is that the environment images are communicated by wireless communication by a floor-treatment device (or several floor-treatment devices) to the single common database or to the individual databases; in particular, each floor-treatment device communicates for this purpose with the central data-processing system or with every other floor-treatment device.

The comparison of a current environment image of each floor-treatment device is performed according to the invention with all of the environment images that are stored in the common database on the central data-processing system, with the sensing of the above-mentioned obstacle information on each neighboring location found using local visual homing, preferably between the current location and several neighboring locations, in order to identify several home vectors from which the angle values between the locations follow and in order to also determine distances between the locations with this and relative positional information through triangulation.

It is possible according to the invention that detected relative positional information between the locations is associated with those connections that exist between the nodes of these locations on the topological map, so that, when such locations and nodes are used again, the values stored in the connections can be immediately accessed without having to be calculated again.

When several floor-treatment devices are being used, the invention can calculate and allocate values (distance/angle) in the central database or a data-processing system that manages the central database, and the values are sent back to the floor-treatment device that provided the current panoramic image for the comparison, so that this device can supply the value pairs to its navigation algorithm.

On the other hand, the invention can also make a provision that the comparison of a current environment image with the environment images stored in the respective individual database is performed individually by each floor-treatment device, and the obstacle information is determined individually as well.

Independently of whether the method is carried out with only one or with several floor-treatment devices, a comparison can be performed of a new environment image with all other stored environment images in order to detect neighboring locations.

In that case, in a first stage, a group of environment images is determined that satisfy a first comparison criterion in a first comparison with the new environment image, for example with the comparison being less stringent and/or more quickly calculable compared to the second stage, and, in a second stage, environment images are identified from among the group of environment images identified in the first stage that satisfy a second comparison criterion when compared to the new environment image, for example with the comparison being more stringent and more complexly calculated compared to the first stage. Such a procedure can also be performed in more than two stages.

For the comparison in the first stage, not all of the image data of a respective image need be used. A provision can be made to create an image signature for each image that represents the contents of the image and to compare the signatures of the images.

This can provide the advantage that a quick and rough preselection of neighboring locations takes place in the first stage that are grouped together into a group, and a more precise and time-consuming test for a proximity relationship only within the preselected group takes place only then.

According to one embodiment, in the first stage groups of several image lines of one line each are averaged for the current environment image and, after a Fourier transform of every averaged line, a spacing of the absolute values of the Fourier coefficients of this current environment image and the corresponding absolute values of the Fourier coefficients of stored environment images is formed, and a group of environment images is selected from the stored images in which the spacings formed each fall below a threshold.

In this case, the absolute values of the Fourier coefficients constitute the above-mentioned signature.

Here as well, here according to the invention the signature that will be used later for the comparison is already stored upon the addition of nodes to the map and allocation of the environment image. Signature information thus exists already from the outset for every node and the associated image in the topological map that can be accessed at any time.

Here, too, a spacing is understood as being a measure that represents the graphical differences between the images and not a spatial distance. The spacing can be Euclidean, for example.

The discarding of phase information and the mere consideration of absolute values of the Fourier coefficients offers the advantage that the image information being used here for the comparison are rotationally invariant, so the images to be compared do not first have to be arithmetically aligned by an image compass.

Further according to the invention, in the second stage a spacing (Euclidean, for example) is formed from the current environment image to each environment image of the group selected in the first stage, with the calculation of the spacing being particularly repeated several times for two environment images while one of the environment images is rotated by an angular value in the azimuthal direction and the minimum of all spacings being selected as the resulting spacing, and with the environment images in such locations being selected as neighboring locations whose spacing falls below a threshold.

Independently of whether the comparison between environment images for identifying neighboring locations is performed using the specific method described herein or using another type of comparative procedure, a provision is preferably made according to the invention that, after the neighboring locations are identified for a current location, the obstacle information that is required according to the invention is calculated, i.e. preferably the angle and the distance at which such a neighboring location is "seen" by the floor-treatment device from the current location.

The angle values can be calculated using a method for local visual homing between each pair of current location and identified neighboring location, since the home vector represents the angle.

Here, in a preferred variant, local visual homing can be carried out using warping methods, such as min-warping, for example. Starting from an environment image (initial image, for example current environment image), images are calculated that a floor-treatment device would record ("see") if it had moved, and the calculated images are compared with the target image, for example the image at the neighboring location; however, the images need not necessarily be explicitly calculated. The comparison can be performed on the basis of the assumed motion parameters, in which the home vector is determined from those motion parameters which provide the best congruence between the calculated image and the target image. Such a min-warping method offers the advantage that an azimuth adjustment need not be carried out using an image compass for the environment images to be compared.

The metric distances between the current location and each neighboring location can then be calculated through triangulation, particularly using local visual homing, between these locations and other locations or nodes used from the topological map, particularly under the inclusion of relative metric information already stored in the map in connections of the associated nodes.

According to the invention, new metric distance information that is calculated between two locations can be stored in connections of the associated nodes in the map.

With the specific value pairs of angle and distance for each pair of current location and neighboring location obtained in this way, the navigation, i.e. the controlling of the drives of the wheels of a respective floor-treatment device, can be carried out as a function of these value pairs, particularly with control of the spacing between the path currently being traveled and a previous path identified by the neighboring locations.

According to the foregoing description, a self-driving floor-treatment device according to the invention comprises a device for treating a floor, particularly a vacuum-cleaning device, as well as drives that are controlled by electronics, with such a device also being set up, particularly with the electronics being programmed, to carry out a method of the above-described type.

An algorithm is preferably implemented in the form of a program that is executed by a microprocessor that controls the wheels of the device as a function of pairs of distance values and angle values that represent the relative spatial relationship between the device and an obstacle. Alternatively or even cumulatively, value pairs of distance and angle in relation to real obstacles (objects) and virtual obstacles are supplied to the algorithm and/or the part of the program that is executing it, with the virtual obstacles being constituted by locations in which a floor-treatment device has already been.

The device is set up to access a purely topological map in a database in which a node is formed such every such location.

BRIEF DESCRIPTION OF THE DRAWING

The method according to the invention will be described in further detail with reference to the drawing in which.

SPECIFIC DESCRIPTION OF THE INVENTION

Figure 1:
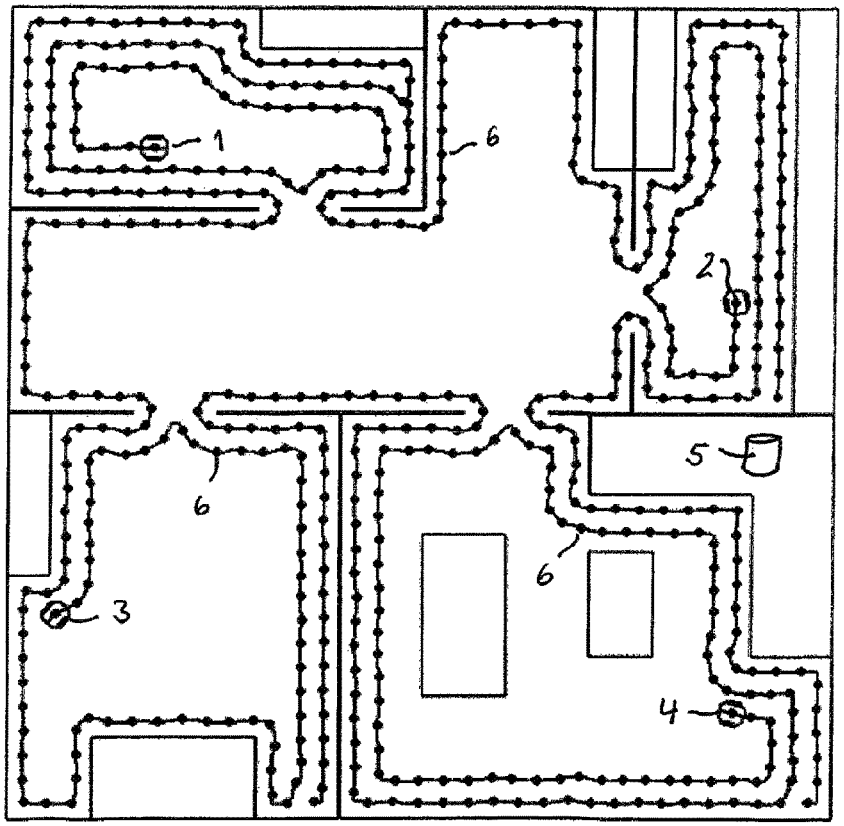
FIG. 1 shows an exemplary residence with several rooms in which four floor-treatment devices 1-4 are treating, i.e. vacuuming, the floor of the residence simultaneously.

All of the devices 1 to 4 operate using the same navigation method and communicate here via radio, for example WLAN, via a central database 5 that is managed in a data-processing system and comprises a topological map with nodes for all locations at which a panoramic image has been created by any of the devices 1 to 4. These locations are designated by dots 6 in FIG. 1. The points have graphically represented connections here in order to designate the paths of motion of each floor-treatment device 1 to 4.

It can be seen here that there are no path intersections, which is due to the method according to the invention, according to which a check is performed for each floor-treatment device 1 to 4 at its current location whether there are neighboring locations in which any of the floor-treatment devices has already been. Such locations are identified as obstacles and driven around by the navigation algorithm in accordance with the explanations in the general part of the description.

If a device is surrounded only by areas that have already been traveled over, i.e. virtual or real obstacles, it searches for untreated areas that are still unoccupied, which can be achieved using free-space detection by the stored topological map.

Figure 2:
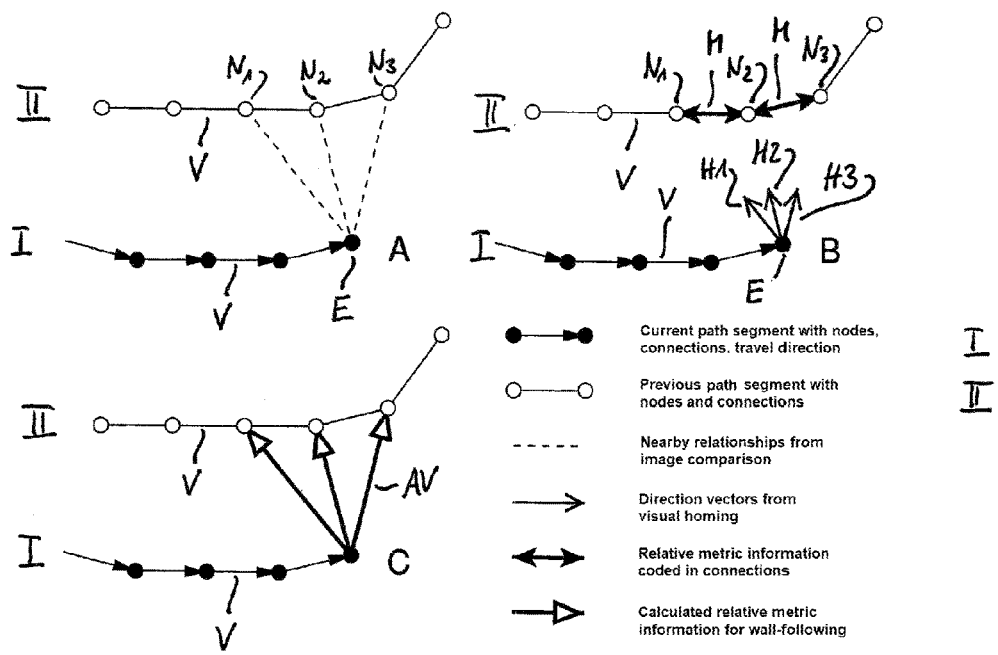
FIG. 2 is a diagram illustrating this invention.

FIG. 2 explains the procedure for each of the floor-treatment devices 1 to 4.

We assume here that a device is located at a current path segment I that is next to a path segment II that has already been traveled. The points of the path segments I and II represent nodes in the topological map to which panoramic images of the associated locations are allocated. Solid connections V between points of a respective path segment I or II represent connection in the topological map to which relative metric information from an odometer is allocated.

According to part A of FIG. 2, a comparison is done at the location of the node E of the path 1 of which nodes in the map belong to locations near the location of the node E. These nearby locations or nodes N1, N2, N3 are shown by broken lines in part A of FIG. 2.

After identification of these locations N, the home vector H1, H2, H3 between current location E and neighboring location N1, N2, N3 is determined according to part B through local visual homing. These vectors represent the angle at which the neighboring location N appears relative to the direction of motion from the current location E.

Together with metric information M in the connections of the neighboring locations N1, N2, N3 that can be read out from the map, the distance between location E and every neighboring location N can be calculated through triangulation.

Accordingly, a distance vector AV represents the angle and the distance between location E and each neighboring location N. The value pairs of distance value and angle of each neighboring location constitute input parameters for the navigation algorithm of the device whose purpose it is to control the wheels as a function thereof, thereby controlling the spacing between the paths I and II to a desired value.

As a result, the device travels essentially at a constant spacing from, particularly quasi "parallel" to the previous path II of another device. The navigation algorithm interprets the locations on this previous path II as obstacles along which it should travel in accordance with the navigational strategy established in the algorithm.

The invention claimed is:

1. A navigation method for a floor-treatment device that is self-driving, the method comprising the steps of:
controlling drives of the floor-treatment device as a function of obstacle information for at least one real object whose obstacle information is detected by sensors on the floor-treatment device;
recording with the floor-treatment device environment images in temporal or spatial intervals at respective locations along a travel path by a camera carried by the floor-treatment device as the floor-treatment device navigates by visual homing;
forming a topological map in a database to which a node is added by the floor-treatment device for every location at which an environment image is recorded and with each of which at least a respective one of the environment images is associated;
forming connections between each node and at least one other node that already exists on the map, was already added by the floor-treatment device, and with which the object information is associated;
determining through a comparison of each newly recorded environment image at respective location for which a new node is being added to the map for all of the environment images in the database that have already been associated with respective nodes whether there is at least one neighboring location in limited proximity of the location belonging to the newly recorded environment image for which a node and an associated environment image have been stored in the map by the same or another floor-treatment device;
if at least one such neighboring location is present, adding a new connection from the newly recorded node to the associated node of each and every identified neighboring location on the topological map; and
for at least one neighboring location to whose node a new connection has been added to the map, calculating obstacle information pertaining to the current location of the newly recorded environment image from the data stored in the map, and using this to control the drives of the floor-treatment device.

2. The method defined in claim 1, wherein the floor-treatment device continues to move at a spacing from locations whose nodes or environment images have connections to travel-distance information in the topological map starting from a node of a recorded neighboring location.

3. The method defined in claim 1, wherein, in the case of a plurality of the floor-treatment devices treating a floor simultaneously, in order to create a single common topological map, the environment images of all floor-treatment devices are stored in
a single common database in a central data-processing system, or
in an individual database on each floor-treatment device, in which case the contents of all individual databases are identical, or each individual database comprises only a portion of the common map.

4. The method defined in claim 3, further comprising the step of:
communicating the environment images wirelessly by the floor-treatment devices to the single common database or to the respective individual databases, each floor-treatment device communicating for this purpose with the central data-processing system or with every other floor-treatment device.

5. The method defined in claim 3, further comprising the step of:
comparing a current environment image of each floor-treatment device in the central data-processing system with all of the environment images stored in the common database, and
sending back the obstacle information determined by local visual homing to the floor-treatment device that supplied the current environment image for comparison.

6. The method defined in claim 3, further comprising the steps of:
effecting the comparison of a current environment image with the environment images stored in the respective individual database individually by each floor-treatment device, and
determining the obstacle information individually as well.

7. The method defined in claim 1, wherein the comparison of a new environment image with all other stored environment images takes place a first step of
determining a group of environment that satisfy a first comparison criterion in a first less stringent and more quickly calculable comparison with the new environment image, and by a subsequent second step of:
identifying environment images from among the group of environment images identified in the first stage that satisfy a second more stringent and more complexly calculated comparison criterion when compared to the newly identified environment image.

8. The method defined in claim 7, wherein, in the first step, groups of several image lines of one line each are averaged for the current environment image and, after a Fourier transform of every averaged line, a spacing of absolute values of Fourier coefficients and corresponding absolute values of the Fourier coefficients of stored environment images is formed, and a group of environment images is selected from the stored images in which distances each fall below a threshold.

9. The method defined in claim 8, wherein, in the second step, a spacing is formed from the current environment image to each image of the selected group, with the calculation of the spacing being repeated several times for two environment images while one of the environment images is rotated by an angular value in an azimuthal direction and a minimum of all spacings being selected, and with the environment images in such locations being selected as neighboring locations whose spacings fall below a threshold.

10. A navigation method as defined in claim 1 for a plurality of the floor-treatment devices, wherein each of the floor-treatment devices carries out the same navigation method that comprises a wall tracking method in which a wall to be tracked is constituted by both a real wall and by a virtual wall formed by nodes in a topological map jointly constructed by all floor-treatment devices.

11. A self-driving floor-treatment device, comprising a device for treating a floor, as well as drives that are controlled by electronics, wherein it is set up to carry out a method defined in claim 1.

* * * * *